March 17, 1959 C. C. DAVIS 2,878,321

MAGNETIC TAPE RECORD BEARING A SOUND TRACK AND A CONTROL TRACK

Filed Aug. 26, 1953

INVENTOR
C. C. DAVIS
BY
J. F. McEneany
ATTORNEY

United States Patent Office 2,878,321

Patented Mar. 17, 1959

2,878,321

MAGNETIC TAPE RECORD BEARING A SOUND TRACK AND A CONTROL TRACK

Charles C. Davis, Los Angeles, Calif., assignor, by mesne assignments, to Westrex Corporation, a corporation of Delaware Application August 26, 1953, Serial No. 376,586

1 Claim. (Cl. 179—100.2)

Figures 1, 2, 3:
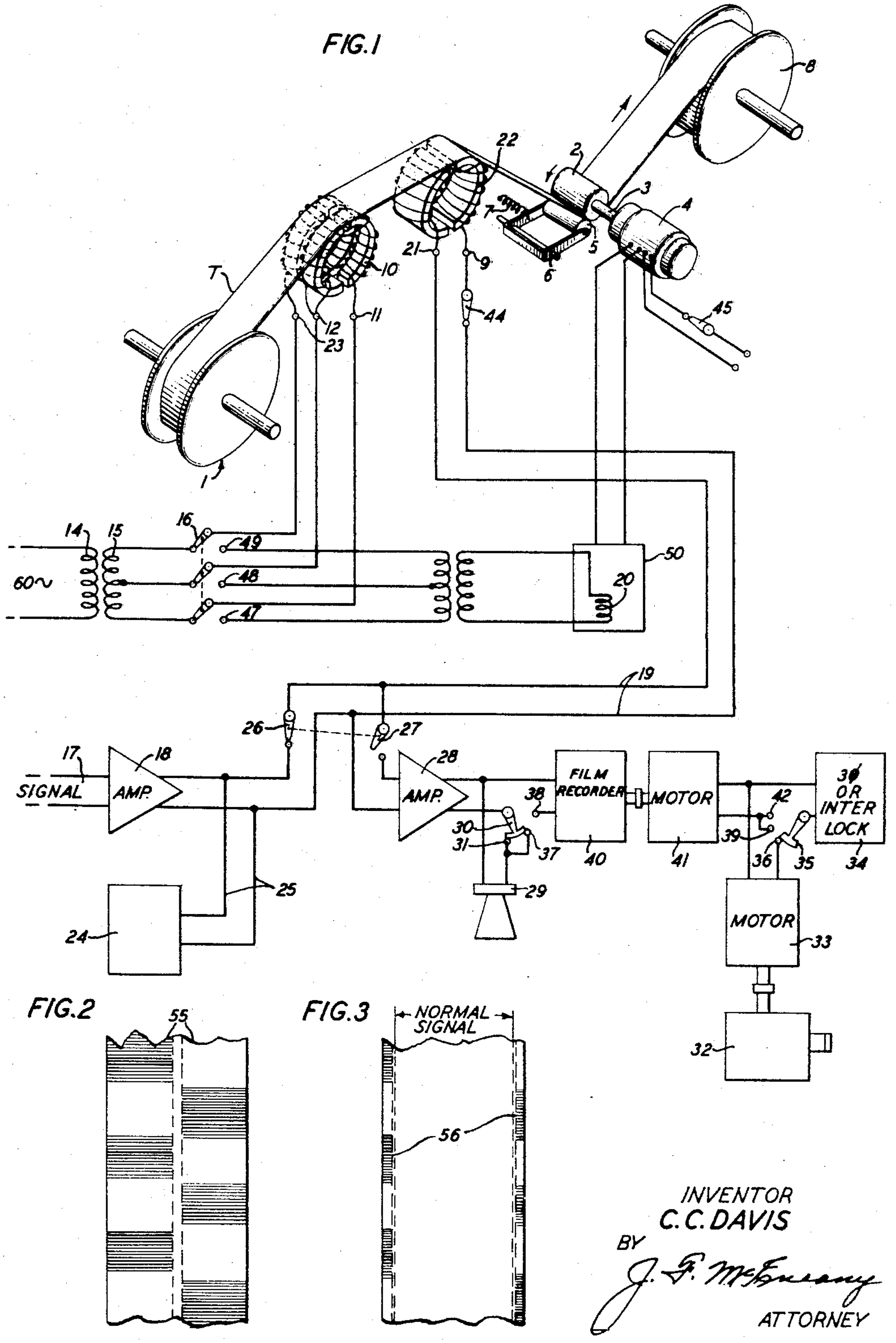

This invention relates to magnetic recording and reproducing systems and particularly to an improved magnetic tape bearing a full frequency range standard sound track and a single frequency control track.

It has been found desirable in the original recording of sound motion pictures to magnetically record the sound accompanying the action on a non-perforated magnetic tape driven simultaneously with a photographic picture recording film. The picture film is marginally perforated and is propelled by sprockets. The non-perforated magnetic tape is propelled by a motor driven pulley which does not consistently produce uniform forward motion of the magnetic tape during recording. Therefore, unless means are provided for driving the tape during reproduction with the same speed variations experienced by it during recording, the reproduced sound will not be in synchronism with the picture image projected from a positive print of the simultaneously recorded picture film.

In order to subsequently obtain synchronous reproduction of sound from magnetic tape and an image from a simultaneously recorded photographic film, it has been proposed heretofore to supply a single frequency current to magnetic recording means which records this frequency on the magnetic tape as a control track. During reproduction, this control track is separately reproduced as an electric current, the frequency of which is compared with a single frequency identical to that originally supplied for the control track during recording. Any difference frequency obtained from this comparison is used to vary the speed of the tape driving means in a manner to produce forward motion of the tape during reproduction at the same speed the tape experienced at the time the sound was recorded thereon.

In one speed control system proposed heretofore, the single frequency is employed to modulate a carrier frequency which is recorded on the magnetic tape as a control track. Both in the recording and the reproduction of this control track, relatively expensive additional equipment units are required. In another system proposed heretofore, 60-cycle current from a readily available source is recorded on the magnetic tape along with the sound track. During reproduction the single frequency control current is separated from the sound currents by electrical filter means. In this proposed system, a relatively expensive electrical filter is required in reproduction and, more importantly, the frequency range of the reproduced sound track is restricted by the necessary elimination from the sound frequency range of frequencies in the range up to and including the control frequency. The problem is not solved by recording the single frequency on an area of the tape separate from the area occupied by the sound track or superimposed at 90 degrees to the sound track as it has been found that when recorded magnetically on tape, long wave lengths spread into adjoining areas. Thus, it has been found to be practically impossible to isolate the control track from the sound track without resorting to relatively expensive systems of the type first mentioned.

It is the object of this invention to provide a magnetic tape bearing a full frequency range standard magnetic sound track and a magnetic control track, the single frequency of which is within but does not restrict the frequency range of nor introduce distortion into sound reproduced from the sound track.

In accordance with this invention, a push-pull type control track is magnetically recorded on the tape simultaneously with the recording thereon of a full frequency range standard magnetic sound track. The two halves of the push-pull control track may be recorded on an area or areas of the tape separate from the area occupied by the sound track or they may be superimposed on the sound track. The two tracks may be substantially reproduced without interference one from the other. During reproduction of the sound and control tracks, the push-pull control track will not be reproduced by the standard reproducing head for the sound track and the standard sound track signal will be canceled out in the push-pull reproducing circuit for the control track. If the push-pull control track is recorded on opposite edges of the tape, any fringing of the long wave length into the sound track is canceled out in the single reproducing head for the sound track.

While the system in accordance with applicant's invention requires a two-gap magnetic head capable of recording and reproducing a push-pull track, this two-gap head, because of its use in recording a single frequency only, may be of simple construction and relatively inexpensive to manufacture.

The invention will be more readily understood from the following description of the accompanying drawings in which:

Fig. 1 is a diagrammatic representation of a magnetic tape recording and reproducing system in accordance with this invention;

Fig. 2 is an enlarged view of a magnetic tape showing a push-pull magnetic control track recorded thereon and over which is to be superimposed a standard magnetic sound track; and Fig. 3 is an enlarged view of a magnetic tape bearing a push-pull control track, the half tracks of the push-pull track being recorded on the marginal edges of the tape to permit the sound track to be recorded therebetween.

Referring to Fig. 1, numeral 1 indicates a supply reel for a non-perforated magnetic tape T. The magnetic tape is drawn from the supply reel by a pulley 2 mounted on rotating shaft 3 of an electric motor 4. A roller 5, pivoted at 6, is urged by spring 7 against the tape T on pulley 2. The pulley 2 is rotated in a direction indicated by the arrow to draw the tape from the feed reel 1 and feed it to a take-up reel 8. This take-up reel is driven from a power source through a conventional friction clutch, not shown in the drawings.

The magnetic tape in its movement from feed to take-up reel is first engaged by a two-gap magnetic head 10. The winding for one head is connected to terminals 11 and 12 and the winding for the other head is connected to terminals 12 and 23. A source of regulated 60-cycle current is fed to the primary of transformer 14 the secondary 15 of which is connected through switch 16 to the terminals 11, 12, and 23.

A sound recording circuit includes a speech channel 17 which is connected to the input of an amplifier 18. The output of amplifier 18 is connected by conductors 19 to terminals 9 and 21.

A signal recording magnetic head 22 is engaged by the tape T following its engagement with the control track magnet 10. The winding for magnetic head 22 is connected to the terminals 9 and 21. Biasing current for the recorder is obtained from an oscillator and amplifier unit indicated at 24. The output of the oscillator unit is connected to the recording circuit by leads 25. It is the usual practice to insert a network at the output of amplifier 18 such that a high impedance will be presented to the bias frequency at the amplifier output. A switch 26 is included in the sound recording circuit.

The reproducing circuit may be connected to the magnet 22 by means of switch 27. This switch is mechanically linked to switch 26 in the recording circuit so that when switch 27 is closed to reproduce sound from the tape, the switch 26 is opened to disconnect the recording circuit. The reproducing circuit from the switch 27 includes an amplifier 28 and a loudspeaker 29 connected thereto through switch 30 and contact 31.

A picture projector 32, driven by motor 33, is connected to a regulated electrical supply source indicated at 34 through a switch 35 which, in one position, engages contact 36.

If it is desired to re-record the sound from the magnetic tape to a photographic film simultaneously with the projection of the picture from projector 32 and the reproduction of sound from loudspeaker 29, the switch 30 may be moved from engagement with contact 31 to engagement with contacts 37 and 38. At the same time, the switch 35 is moved in the engagement with contacts 36 and 39. By means of this switching arrangement, the output from amplifier 28 is fed to a film recorder 40 which is driven by a motor 41. With the switch 35 in position to engage switch contacts 36 and 39, both the motor 33 for the projector 32 and the motor 41 for the film recorder 40 will be driven from the source 34. If it is desired to re-record the sound from the magnetic tape to a photographic film in recorder 40 without simultaneously reproducing the picture image from projector 32, the switch 35 may be moved to a position to engage only contacts 39 and 42.

In a sound picture recording operation, a picture camera is substituted for projector 32 and switch 35 engages contact 36 only. To initiate the recording operation, switches 26 and 44 in the sound channel, switch 45 in the circuit to the driving motor 4 and the switch 16 are moved to positions shown in the drawing. The magnet head 10 will then record the single frequency push-pull control track on the tape T and the magnet head 22 will record the sound currents on the magnetic tape.

The magnetic control track as recorded by the magnetic head 10 will be that shown in Fig. 2 wherein the control track is recorded across the major portion of the tape and the standard sound track is superimposed over the entire width of the tape. In this case, the push-pull control track is recorded at a level high enough to compensate for the ensuing partial erasure thereof produced by the biasing current at the recording magnetic head 22. The control track level during reproduction will then be high enough to permit its use for control purposes but will not be high enough to seriously limit the capabilities of the tape to receive high level signal at magnet head 22.

During the recording of the sound on the magnetic tape, it is inevitable that slippage will occur between the tape T and its driving pulley 2, thus producing a non-uniform forward motion of the tape during recording. This will result during reproduction in a lack of exact synchronism between the sound and the picture projected from the sprocket driven film unless, during reproduction, the sound tape T is driven with the same speed variations it experienced during recording.

During reproduction, the single frequency control track which was previously recorded on the tape, is reproduced therefrom by push-pull magnet head 10 and fed to a motor control unit 50.

If the tape, during reproduction, is driven at any instant at a speed faster or slower than the speed at which it was driven at recording, the frequency of the control current reproduced by magnet 10 will be respectively higher than or lower than the fixed frequency of the control current recorded on the tape. It is these variations in the frequency of the reproduced control current from the constant frequency of the current from a regulated source that are used to vary the speed of the tape driving motor 4 during reproduction.

At the completion of a recording operation, the magnetic tape T is rewound on feed reel 1 in preparation of reproduction of the sounds therefrom. A positive print picture film is obtained from the recorded negative and placed in the projector 32.

To initiate the synchronous reproduction of the sound and picture, switch 27 is closed on its contact and switch 26 is opened. Switch 16 is moved to a second position such that the leads from terminals 11, 12 and 23 will be connected to terminals 47, 48 and 49, respectively. The switch 44 in the speech circuit and the switch 45 in the motor circuit are simultaneously closed and the motor 4 is operated to drive the tape T past the magnetic heads 11 and 22. With switches 30 and 35 in the position shown in the drawings, the sound translated by magnetic head 22 from tape T is reproduced by loudspeaker 29 simultaneously with the projection of the picture on a suitable screen.

In the motor speed control unit indicated at 50, a motor control circuit substantially similar to that disclosed in United States Patent 2,395,517, February 26, 1946, to H. M. Stoller, can be used if modified to the extent that the winding 13 of the patent is eliminated and the pilot frequency applied to coil 20 of the patent is the control frequency reproduced by magnet 10 of this disclosure. The resonant circuit formed by the coil and capacitor of the first bridge arm of the patent would be tuned to the predetermined control track frequency applied to the tape during recording.

In Fig. 2, the push-pull control track 55, recorded by magnet head 10, covers substantially the full width of the tape and is recorded thereon at a relatively high level so that it will still be suitable for control purposes after the partial erase thereof caused by the bias current which is applied on magnet 22 along with the signal currents.

In Fig. 3, each half of the push-pull control track 56 is recorded on a marginal edge of the tape, thus leaving the major portion of the tape for recording the signal track. Spreading of the long wave length of the control track into the signal track area will not produce distortion in the reproduced signal because it will be canceled out by the push-pull cancellation into the standard magnetic reproducing head 22.

Applicant provides a novel magnetic record, and a novel method and system for recording and reproducing this record. By means of applicant's invention, a single frequency control track may be added to a signal track on a magnetic tape. The control track frequency may be within the frequency range of the signal track without restricting this sound frequency range and the two records may be separately reproduced without distortion in the reproduced sound.

What is claimed is:

In combination in a system for simultaneously magnetically recording sound and related control currents in the same sound track area of a magnetic tape, of means producing movement of said tape, first recording magnet means engaging said tape to record thereon two identical currents of a single frequency in opposite polarity, each said single frequency records extending longitudinally of said tape in a separate transverse area thereof, second magnet means engaging said tape across substantially the full width thereof to record thereon a current representing sounds superimposed on the tracks recorded by said first magnet means, and means for biasing said second magnet means at a level which is less than that of said first recorded single frequency currents.

References Cited in the file of this patent

UNITED STATES PATENTS

| | | |
|---|---|---|
| 699,630 | Pedersen | May 6, 1902 |
| 2,709,204 | Holmes | May 24, 1955 |

OTHER REFERENCES

Journal of the SMPTE, March 1950, pp. 328–336.